UNITED STATES PATENT OFFICE.

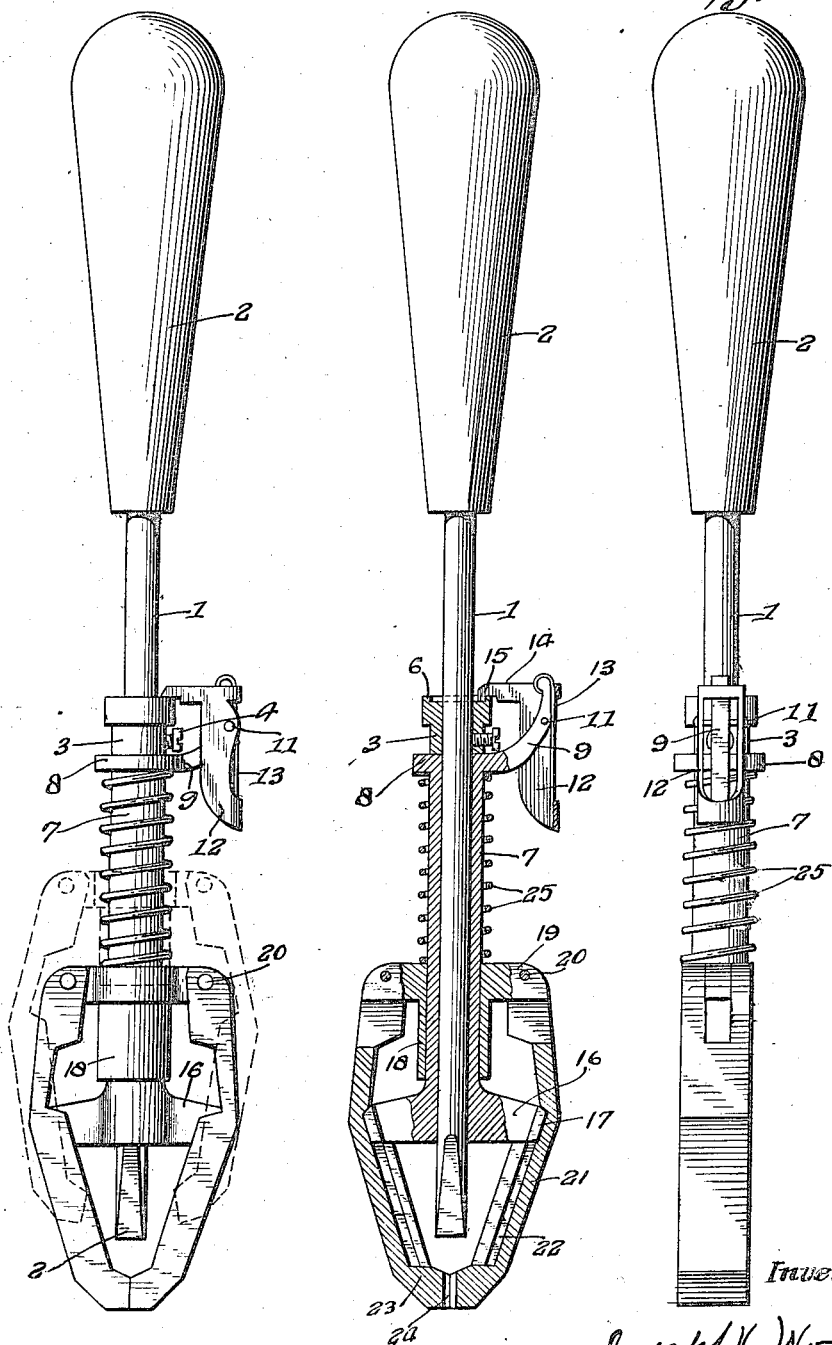

JOSEPH V. WORK, OF PALISADE, NEBRASKA.

SCREW-DRIVER ATTACHMENT.

1,424,703. Specification of Letters Patent. Patented Aug. 1, 1922.

Application filed November 12, 1921. Serial No. 514,782.

*To all whom it may concern:*

Be it known that I, JOSEPH V. WORK, a citizen of the United States, residing at Palisade, in the county of Hitchcock and State of Nebraska, have invented a new and useful Screw-Driver Attachment, of which the following is a specification.

My present invention has reference to an attachment for screw drivers.

My object is to provide a screw driver with means whereby a screw will be effectively supported thereon preparatory to the driving of the screw, and wherein the means sustaining the screw will automatically release the latter after the said screw has been driven home a determined distance.

A further object is to produce a screw holding attachment for screw drivers which includes spring influenced jaws designed to grip therebetween the screw so that the kerf in the head thereof will receive therein the bit of the screw driver, and whereby the screw will be effectively supported to permit of the same being driven home either in a straight direction or at desired angles, and wherein means influenced by the pressure of the screw driver in the direction of the screw will force the jaws to screw releasing position so that the screw can be driven entirely home.

It is a still further object to produce a screw holding attachment for screw drivers which is removably associated with the screw driver and which may be adjusted thereon to compensate for the varying lengths of screws engaged thereby, and which is of a construction whereby the holding means will not turn with the screw driver and will exert only a gentle pressure against the work which the screw enters, so that injury to such work will not occur.

The foregoing objects, and others which will present themselves as the nature of the invention is better understood, may be accomplished by a construction, combination and operative association of parts, such as is disclosed by the drawings which accompany and which form part of this specification.

In the drawings:—

Figure 1 is a side elevation of the improvement in applied position, the dotted lines illustrating the arrangement of the jaws when the screw has been driven entirely home, or when a screw is to be arranged between the said jaws.

Figure 2 is a view similar to Figure 1, with parts in section.

Figure 3 is a view taken at right angles to the showing in Figures 1 and 2.

In the drawings, I have illustrated my improvement applied to a screw driver of the ordinary construction. The shank 1 of the screw driver has the usual handle 2 secured on one of its ends, its opposite or outer end being shaped to provide the screw engaging bit 2. By reference to the drawings, it will be seen that the bit 2 has its widest cross sectional diameter equalling that of the shank 1.

In carrying out my improvement, I slide over the bit 2 on to the shank 1 a collar 3. The collar has a threaded opening therethrough for the reception of a binding screw 4 the said screw engaging the shank holds the collar adjustable thereon. The collar has its outer end preferably enlarged and centrally depressed to form the same with an annular flange 6.

Freely slidable and rotatable on the shank 1 there is a sleeve 7. This sleeve has its outer end formed with a head 8 which is normally contacted by the collar 3, in a manner which will presently be described. The head 8 has an outwardly projected arm 9 which terminates in a rounded end. Pivoted, as at 11 to the arm 9 there is an angle lever 12. Between the lever 12 and the rounded end of the arm 9 there is a flat spring 13 which normally holds the lever in one position with respect to the arm. The upper or angle end 14 of the lever is notched to provide the same with a depending tooth 15 which is disposed over the flange 6 and received in the depressed outer end of the collar 3.

On the end of the sleeve opposite that provided with the head 8 there is a pair of oppositely disposed projections in the nature of arms 16 respectively, the said arms having their ends arranged at a downward angle and formed with lateral extensions 17. Thus the arms are substantially T-shaped in plan.

Surrounding and slidable on the sleeve 7 there is a second sleeve 18. The sleeve 18 has its outer end formed with oppositely disposed outwardly projecting fingers 19 respectively, and to each of these fingers there is pivoted, as at 20 the upper or outer end of jaw members 21 respectively. The jaw members have their lower portions arranged at an inward inclination and the inner faces thereof are formed with longitudinally extending T-shaped grooves 22 respectively to receive therein the lateral extensions 17 on the arms 16 of the sleeve 7. The active ends of the jaws are indicated by the numeral 23, the same being provided with registering notches 24 to receive therebetween a screw.

Exerting a tension between the head 8 of the sleeve 7 and the upper or outer end of the sleeve 18 there is a helical spring 25.

In arranging a screw between the jaws 21, the operator grasps the said jaws to move the same against the pressure of the spring 25 in the direction of the handle 2 of the screw driver. Because of the contacting engagement of the T-shaped arms 16 in the grooves of the jaws, and the angular relation of these parts, it will be apparent that the jaws will be moved away from each other. The kerfed head of the screw then receives the bit of the screw driver and pressure on the jaws is released to permit of the spring 25 returning the jaws to initial position to grip the screw therebetween. The screw is turned by the screw driver in the usual manner. The screw will be held between the jaws until partly screwed home, and thereafter when pressure in the direction of the screw is exerted by the screw driver, the collar 6 contacting the head 8 of the sleeve 7 will move the same toward the bit end of the screw driver, causing the arm 16 to spread the jaws 21 away from each other, thus releasing the screw from engagement by the jaw. Because of the loose arrangement of the sleeves on each other, and on the shank 1 the jaws will not turn with the turning of the screwdriver, and the only pressure exerted by the jaws on the work which the screw enters is incident to the influence of the comparatively light spring 25, with the result that no injury will be inflicted to the work. The lever engagement with the flanged end 6 of the collar 3 permits of the ready removal of the attachment from the screw driver, it being apparent that a pressure on the end of the straight end of the arm of the angle lever 12 will swing the same on its pivot 11 to bring the tooth 15 out of contact with the flange 6, when the device as a whole can be slid over the bit end of the screw driver. It will also be apparent that by adjusting the collar 3 on the shank 1 the engaging ends 22 of the jaws 21 can be regulated with respect to the bit of the screw driver, so that screws of varying lengths can be properly engaged by the improvement. It is also thought that the foregoing description, when taken in connection with the drawings will fully set forth the construction and advantages of the improvement.

I claim—

1. The combination with a screw driver having an adjustable collar thereon, a screw holder attachment therefor, comprising pivotally supported spring influenced screw engaging jaws, means on the shank of the screw driver contacting the collar and engaging between the jaws to swing the jaws away from each other when pressure, to a determined extent, is exerted thereagainst, and means removably associating the last mentioned means with the collar.

2. The combination with a screw driver, of a slidable and rotatable sleeve adjustably and removably sustained on the shank thereof, a second sleeve slidable on the first mentioned sleeve, oppositely arranged screw engaging jaws pivotally associated with the last mentioned sleeve and having their active ends normally disposed outward from the bit of the screw driver, and means on the first mentioned sleeve coengaging with the confronting faces of the jaws whereby, when a determined pressure is exerted on the screw driver the latter will move the first mentioned jaw causing the last mentioned means to spread the jaws away from each other and release a screw from therebetween.

3. The combination with a screw driver having an adjustable collar thereon, of a sleeve slidably and rotatably arranged on the shank of the screw driver, a head on the inner end of the sleeve, a spring influenced angle lever supported from the sleeve and in contacting engagement with the outer face of the collar, a second sleeve arranged for slidable movement on the first mentioned sleeve, a helical spring surrounding the first mentioned sleeve, in contact with the head thereof and in contact with the last mentioned sleeve, oppositely disposed screw engaging jaws pivotally secured to the last mentioned sleeve and having their active ends normally disposed outwardly of the bit of the screw driver, and laterally extending means on the first mentioned sleeve coengaging in the confronting faces of the jaws for moving the jaws away from each other when a determined pressure is exerted on the said first mentioned sleeve by the pressure of the screw driver thereagainst, and said spring designed to return the jaws to initial position when such pressure is relieved.

4. The combination with a screw driver having a flanged adjustable collar thereon, of a screw holding attachment therefor, comprising a headed sleeve slidably arranged on the shank of the screw driver, an angle arm extending from the head, an angle lever pivoted to the arm, and said lever having one of its branches toothed to engage the flange of the collar, spring means between the arm and lever retaining the latter in collar engagement, opposed arms on the outer end of the sleeve having inwardly inclined ends which are flanged laterally, a second and shorter collar mounted on the first mentioned collar, a spring surrounding the first mentioned collar exerting a pressure between the head thereof and the last mentioned collar, a pair of opposed jaws pivotally secured to the last mentioned collar having inner angle portions provided with longitudinal T-shaped grooves that receive the ends of the arms on the first mentioned collar therein, all as and for the purpose set forth.

JOSEPH V. WORK.